2,896,705
EVAPORATION OF LIQUIDS

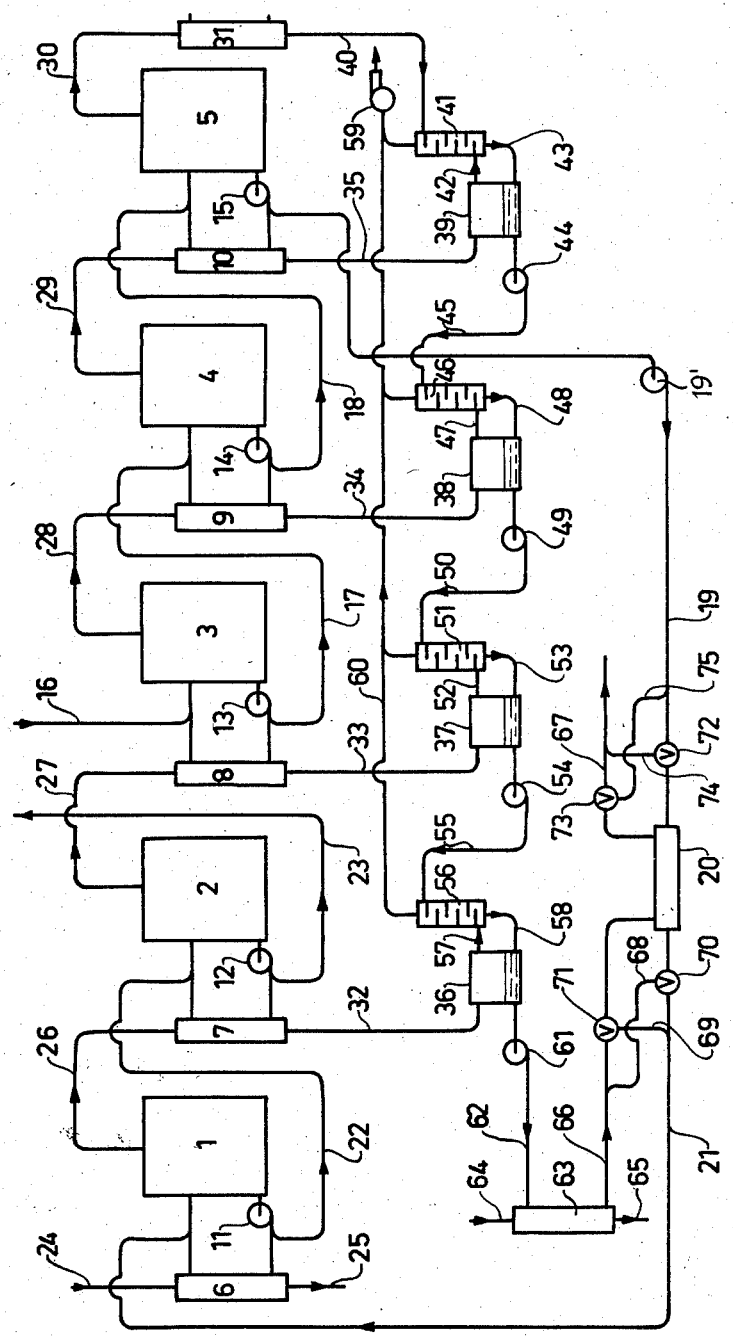

Torsten Ramén, Stockholm, Sweden

Application March 23, 1956, Serial No. 573,397

3 Claims. (Cl. 159—47)

The present invention relates to evaporation of liquids such as sulfite waste liquor, and is more particularly concerned with an evaporation process in which as the heating medium in the heating bodies of the evaporators there are utilized vapors derived from the liquid being evaporated.

It is customary in multi-stage evaporation installations to utilize vapors driven off from the liquid being evaporated in one step, as the heating medium in a step operating at a lower temperature. Said vapors are then condensed in the heating body of the evaporator operating at the lower temperature and the condensate formed is withdrawn from the heating body. The vapors usually contain uncondensable gases, which are separated from the condensate in a separator tank. The vapors may also contain condensable gases, e.g. aldehydes in the case of sulfite waste liquor, which tend to form deposits on the heating surfaces of the evaporators. To remove this disadvantage it has been proposed to withdraw so much heating vapor from the vapor side of the heating bodies that the partial pressure of these condensable gases in the heating body will fall below the value at which condensation thereof occurs.

The main object of the present invention is to improve the heat economy of an evaporation system of the type referred to in which uncondensed vapors and gases are withdrawn from the vapor side of the heating bodies of the evaporators, by utilizing the heat of such vapors and gases. Other objects will appear as the description proceeds.

The present invention comprises utilizing the gas and vapor mixture withdrawn from the heating body to heat condensate derived from vapors which are driven off in the same evaporation step or in an evaporation step, operating with a lower temperature, whereupon the heated condensate, if desired after further heating, is utilized to preheat liquid to be evaporated in any evaporation step.

The invention will be described in more detail below with reference to the attached drawing, which shows by way of example a diagrammatic flow-sheet of an installation for evaporating sulfite waste liquor embodying the principles of the present invention.

The illustrated installation comprises five evaporators 1, 2, 3, 4, 5 with associated heating bodies 6, 7, 8, 9 and 10 respectively, through which the liquid to be evaporated, e.g. sulfite waste liquor, is circulated by means of pumps 11, 12, 13, 14 and 15 respectively. The five evaporators may operate at temperatures of, e.g., 135, 120, 105, 80 and 65° C.

The liquor is supplied to the system through the conduit 16 and enters the third evaporation step. From this step, the partially evaporated liquor passes through conduit 17 to the fourth evaporation step and therefrom through conduit 18 to the fifth evaporation step. Therefrom, the liquor is pumped by pump 19' through the conduit 19 to a heat exchanger 20, where it is preheated with heated condensate, as described below. The preheated liquor is supplied to the first evaporation step through conduit 21, and thence the liquor passes through conduit 22 to the second evaporation step, from which the finally evaporated liquor is discharged through conduit 23.

In the heating body 6, the liquor is heated by means of live steam supplied through conduit 24. The condensate formed thereby is returned to the boiler through conduit 25. In the heating bodies 7, 8, 9, 10 the vapors driven off in the evaporators 1, 2, 3 and 4 respectively are used as the heating media, said vapors being supplied to the heating bodies through conduits 26, 27, 28 and 29 respectively. The vapors driven off in evaporator 5 are passed through the conduit 30 to a condenser 31.

In the heating bodies 7, 8, 9 and 10 the vapors supplied are partially condensed, the apparatus being preferably operated so that no condensation of such condensable gases, such as aldehydes and similar substances, which can form undesirable deposits on the heating surfaces, can occur, which is achieved by controlling the amount of vapors withdrawn so that the partial pressure of such gases are kept below that at which condensation takes place. The resultant mixtures of condensate, vapors and gases are supplied through conduits 32, 33, 34 and 35 respectively to four corresponding separator tanks 36, 37, 38 and 39 respectively in which the condensate precipitates. The mixture of condensate, vapors and gases obtained in condenser 31 is passed through the conduit 40 to the upper portion of a scrubber 41, in which the condensate flows downwardly in countercurrent to gas-vapor mixture, which from the separator tank 39 is introduced through conduit 42 at the bottom of the scrubber 41. As this gas-vapor mixture has a higher temperature than the condensate from the condenser 31, this condensate is heated and at the same time a portion of the gas-vapor mixture condenses. The heated condensate is introduced through the conduit 43 into the lower portion of the separator tank 39. From this the liquid, which thus consists of a mixture of condensate from the heating body 10 and the condenser 31, is pumped by pump 44 through conduit 45 to a similar scrubber 46, in which the condensate meets a gas-vapor mixture supplied from separator tank 38 through conduit 47 and is thus further heated. The condensate is introduced through conduit 48 into the lower portion of separator tank 38. Therefrom, condensate is pumped by pump 49 through conduit 50 to scrubber 51, wherein the same procedure is repeated using a gas-vapor mixture supplied from tank 37 through conduit 52, whereupon the now further heated condensate through conduit 53 flows into the separator tank 37. Finally, this condensate is passed by pump 54 through conduit 55 to a further scrubber 56 into which a gas-vapor mixture from tank 36 is introduced through conduit 57 and from which the heated condensate flows through conduit 58 to tank 36.

The remaining vapors and gases from scrubbers 41, 46, 51, 56 are withdrawn by the vacuum pump 59 through the conduit 60.

If the condensate from the condenser 31 has a temperature of about 50° C., the condensate temperature may in this manner be successively raised to close to 120° C. The condensate mixture thus heated is used, as indicated above, to preheat liquor to be introduced into evaporator 1. In the example illustrated, however, the condensate is first further heated and to this end it is pumped from tank 36 by pump 61 through conduit 62 to a heat exchanger 63, in which it is heated by live steam supplied through conduit 64. The steam condensate formed may be returned to the boiler through conduit 65, while the heated condensate is introduced into the above-mentioned heat exchanger 20, where it gives off heat to the liquor and from which it is discharged through conduit 67.

Due to the strong heating in heat exchanger 20, incrustations are deposited from the liquor in this heat exchanger, and therefore this is arranged so that the liquor and the condensate may change places, when necessary, so that the condensate dissolves the deposited incrustations. Thus, the conduits 21 and 66 are interconnected by conduits 68 and 69 which are connected to the conduits 21 and 66 respectively in three-way valves 70 and 71 respectively. Similarly, the conduits 19 and 67 include three-way valves 72 and 73, to which conduits 74 and 75 are connected. As easily seen, it is possible to obtain the desired change in the liquid flow by a suitable resetting of the three-way valves.

The invention is not limited to the embodiment shown and described above but can be varied in many ways within the scope of the claims.

I claim:

1. A method of evaporating a liquid in an evaporation system comprising a plurality of stages, each stage having a separate heating body individually associated therewith and each stage operating at a different evaporating temperature, said method comprising the steps of: evaporating said liquid simultaneously in all of said stages, passing the vapors driven off during the evaporation in a particular heating stage as a heating medium into the heating body of a stage which operates at a lower temperature than said particular stage and therein condensing the vapors so generated to form a first condensate, separating the gases and uncondensed vapors from the heating side of the heating body of the evaporating stage having the next higher evaporating temperature than said lower temperature stage which are the gases and vapors generated in the evaporator stage next higher than the particular stage, passing said gases and uncondensed vapors in countercurrent to and in direct contact with said first condensate whereby said last mentioned uncondensed vapors are at least partially condensed and merge with and heat said first condensate and so form a second condensate, passing said second heated condensate in indirect heat exchange with the liquid being introduced into an evaporating stage which operates at a temperature no lower than the next higher temperature above said particular stage, and exhausting the gases and the vapors which remain uncondensed after said passage in countercurrent.

2. A method according to claim 1, in which said exhausting step produces a sufficiently low partial pressure with respect to any condensable gas which tends to form deposits on surfaces upon which it condenses so that condensation of such gas is prevented.

3. The method according to claim 1, further comprising the additional step of heating said second heated condensate prior to its passage in indirect heat exchange with said liquid being introduced into said evaporating stage which operates at said temperature no lower than the said next higher evaporating temperature.

References Cited in the file of this patent

UNITED STATES PATENTS

| | | |
|---|---|---|
| 1,552,562 | Kirgan | Sept. 8, 1925 |
| 2,510,233 | Kermer | June 6, 1950 |
| 2,647,570 | Lockman | Aug. 4, 1953 |
| 2,734,565 | Lockman | Feb. 14, 1956 |